Sept. 23, 1941.  E. BUGATTI  2,257,034
DEVICE FOR CONJUGATING THE ROTATIONS OF ROTATING MEMBERS
Filed Nov. 2, 1939
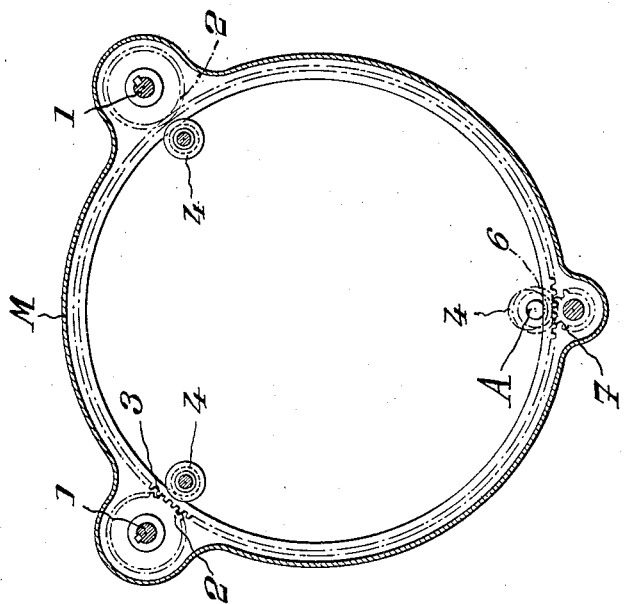
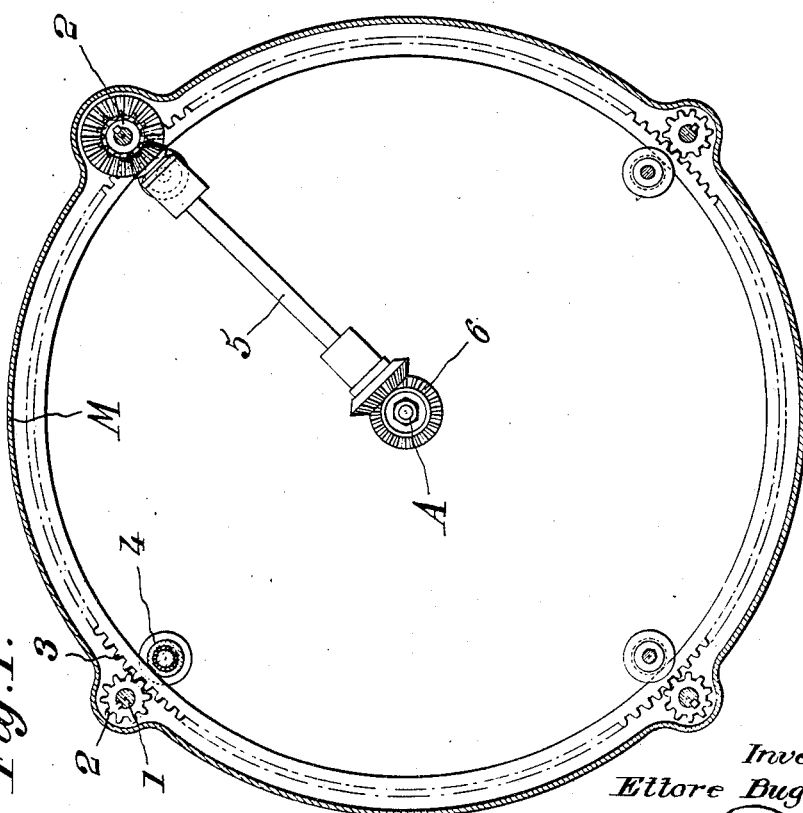
Inventor:
Ettore Bugatti,
Attorneys Patented Sept. 23, 1941

2,257,034

UNITED STATES PATENT OFFICE 2,257,034

DEVICE FOR CONJUGATING THE ROTATIONS OF ROTATING MEMBERS

Ettore Bugatti, Paris, France

Application November 2, 1939, Serial No. 302,619
In Luxemburg March 15, 1938

2 Claims. (Cl. 74—414)

The present invention relates to devices for conjugating the rotations of rotating members some of which may be driving members while others are, or may be, driven members. The invention is more exclusively, although not exclusively, concerned with devices of this kind for conjugating the rotations of rotating pieces the distances between the axes of which are liable to vary due to expansions or contractions of their supports.

The essential purpose of the present invention is to provide a device of this kind which is better adapted to meet the requirements of practice than those employed up to the present time, and in particular to provide a device of this kind which is capable of working correctly irrespective of the effects of expansions or contractions of the supports of the rotary members the rotations of which are to be conjugated.

According to an essential feature of the present invention, I provide pinions or the like, operatively connected to the respective rotating members the rotations of which are to be conjugated, and I make use of a toothed annular member having a certain flexibility in its own plane (so that it can deform under the effect of variations of distance between the axes of said rotating members) for interconnecting said pinions, guiding means being provided for keeping said annular member constantly in correct mesh with the above mentioned pinions with which it coacts.

Other features of the present invention will result from the following detailed description of some specific embodiments thereof.

Preferred embodiments of the present invention will be hereinafter described with reference to the accompanying drawing, given merely by way of example, and in which:

Fig. 1 is a diagrammatic end view of a machine or system including rotating parts interconnected by means of the device according to the present invention;

Fig. 2 is a diagrammatical view, similar to Fig. 1, showing another embodiment of the device according to the invention.

In the following description, it will be assumed that it is desired to provide a device of the type above described for conjugating the rotations of the spindles or shafts 1 of a machine M.

According to the essential feature of the invention, I provide a plurality of pinions 2, operatively connected with said spindles 1 (for instance directly keyed on said spindles), and a toothed annular member 3 is arranged to coact with all of these pinions. This annular member is so made as to have a certain elasticity in its own plane. Guiding means, such for instance as rollers 4, are provided for compelling said annular member 3 to mesh correctly with said pinions.

It will be readily understood that, with such an arrangement, the working of the means for controlling the movement of spindles 1 is not perturbed when the frame of machine M undergoes deformations due to expansions or contractions.

As a matter of fact, the flexibility of annular member 3 (which flexibility can, for instance, be obtained by constituting said annular member by a metallic ring or hoop without hub and of small radial thickness) will enable said member 3 to be deformed, and in particular to be stretched between two successive rollers 4, so as to accompany pinions 2 in their displacements resulting from the expansion or contraction of the elements which act as supports for spindles 1.

For this purpose, in accordance with the general principle above set forth, I may advantageously employ the following arrangement, illustrated by the drawing:

The annular member 3 is provided with external teeth and rollers 4 are positioned to bear on the internal face of said annular member.

There is provided one such rollers opposite each of the pinions 2, each of said rollers being freely journalled on a spindle rigid with the frame acting as support for the corresponding spindle or shaft 1.

With such an arrangement, the two last mentioned elements (to wit pinion 2 and the corresponding roller 4) undergo substantially equal displacements when said frame undergoes expansion or contraction, whereby the distance between their axes thus remains practically constant.

The toothed annular member 3 may be driven in different ways:

For instance, in the embodiment illustrated by Fig. 1, said annular member 3 is driven by one of the peripheral pinions 2. In this case, the spindle or shaft 1 of said pinion 2 is driven independently, for instance by means of an intermediate shaft 5, itself driven by a pinion 6 keyed at the end of a main driving shaft A.

Alternately, in the embodiment illustrated by Fig. 2, annular member 3 is driven by means of a supplementary driving pinion 7, located at the periphery of said annular member, similarly to pinions 2, said pinion 7 being driven at a suitable speed by a pinion 6 driven by the driving shaft A.

Of course, account shall be taken, for the relative positions to be given to the elements which have been above mentioned (annular member 3, pinion 7 or driving pinion 2, rollers 4) of the type of machine M that is considered, and in particular of the relative arrangement of spindles or shafts 1 and of driving shaft A.

For instance, in a machine M of the kind of that shown by Fig. 1, having a central driving shaft, it will be of advantage to arrange toothed annular member 3 coaxially with respect to the driving shaft and in such manner that it passes close to spindles or shafts 1, whereas, in the case of a machine in which the main driving shaft is not centrally disposed with respect to spindles or shafts 1, as illustrated by Fig. 2, annular member 3 will preferably pass close to both the main shaft A and the spindles 1.

Whatever be the particular arrangement that is chosen, I obtain a device for the interconnection of rotary pieces the operation of which results sufficiently clearly from the above explanations for making it unnecessary further to describe it.

Of course, annular member 3 might be given its rotary movement through other means than the peripheral pinions with which it coacts, for instance through an endless screw.

In all cases, a device made according to the present invention has, in addition to the advantage concerning the compensation of the expansions and contractions, that of leaving a free space in the central part of the machine M, in which space it is possible to house certain auxiliary elements of said machine, which could not be placed in this position if the various spindles 1 were all driven through intermediary shafts.

It should be noted that the arrangements which have been above described might advantageously be applied to the control of the distribution means of internal combustion engines, for instance to the control of different camshafts operating engine valves, or to the control of rotary valves, or again to the control of crank means acting on sliding sleeves of the engine.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a system including at least two separate parallel spindles supported independently of one another, a device for conjugating the rotation movements of said spindles, which comprises, in combination, a toothed wheel coaxially keyed on each of said spindles, said toothed wheels being all located in a common plane perpendicular to said spindles, a toothed annular member flexibly deformable in its own plane mounted in mesh with all of said toothed wheels, guiding means for keeping said annular member in correct meshing relation with all of said toothed wheels, and means for driving said toothed annular member, the point of contact of at least one of said guide means and said toothed annular member, the point of mesh between said toothed annular member and one of said toothed wheels, and the axis of rotation of the last-mentioned toothed wheel all being in substantial alignment.

2. In a system including at least three separate parallel spindles supported independently of one another, and a central driving shaft passing through the center of a circle passing through said three spindles, a device for conjugating the rotation movements of said spindles, which comprises, in combination, a toothed wheel coaxially keyed on each of said spindles, said toothed wheels being all located in a common plane perpendicular to said spindles, a toothed annular member flexibly deformable in its own plane mounted in mesh with all of said toothed wheels and coaxially with respect to said central driving shaft, guiding means for keeping said annular member in correct meshing relation with all of said toothed wheels, a radial intermediate shaft, and transmission means between the respective ends of said intermediate shaft and said central driving shaft on the one hand, and one of said toothed wheels, on the other hand, for transmitting the movement of said central shaft to said last mentioned toothed wheel and said toothed annular member.

ETTORE BUGATTI.